United States Patent [19]

Averbeck et al.

[11] Patent Number: 5,577,149
[45] Date of Patent: Nov. 19, 1996

[54] FIBER OPTIC POLISHING FIXTURE

[75] Inventors: Bruno B. Averbeck, Minneapolis; Robert J. Ziebol, Blaine; David J. Emmons, Plymouth, all of Minn.

[73] Assignee: ADC Telecommunications, Inc., Minneapolis, Minn.

[21] Appl. No.: 346,003

[22] Filed: Nov. 29, 1994

[51] Int. Cl.$^6$ .................................................. G02B 6/00
[52] U.S. Cl. .............................. 385/134; 385/77; 385/78; 385/85; 385/147
[58] Field of Search .................................. 385/76, 77, 78, 385/85, 134, 147

[56] References Cited

U.S. PATENT DOCUMENTS

| | | | |
|---|---|---|---|
| 4,362,356 | 12/1982 | Williams et al. | 385/85 X |
| 4,614,402 | 9/1986 | Caron et al. | 385/76 X |
| 4,615,581 | 10/1987 | Morimoto | 385/76 X |
| 4,648,688 | 3/1987 | Ashman et al. | 385/85 X |
| 4,666,241 | 5/1987 | Caron | 385/85 X |
| 4,741,590 | 5/1988 | Caron | 385/85 X |
| 4,978,193 | 12/1990 | Tomita | 385/85 X |
| 5,082,378 | 1/1992 | Muller et al. | 385/72 |
| 5,193,133 | 3/1993 | Schofield et al. | 385/85 |
| 5,325,452 | 6/1994 | Stein et al. | 385/85 X |

OTHER PUBLICATIONS

Szostak, Tad, "High Performance Injection Molded ST™ Compatible Connector for L.A.N. Applications", pp. 16–17, Thomas & Betts Corporation, Raritan, NJ, papers presented at the Eleventh Annual International Fiber Optic Communications and Local Area Networks Exposition, 1987, Anaheim, CA.

*Primary Examiner*—Brian Healy
*Attorney, Agent, or Firm*—Merchant, Gould, Smith, Edell, Welter & Schmidt

[57] ABSTRACT

A fiber optic connector polishing fixture for polishing optical fibers which are to be connected with other optical fibers includes synthetic ruby balls symmetrically aligned on an aluminum substrate which is configured to permit a ferrule and its outer housing to be inserted for polishing. The ruby balls define a polishing plane axially spaced from the substrate for polishing an optical fiber which is longitudinally disposed within the ferrule. The ruby balls and ferrule are moved along an abrasive material until the ferrule and optical fiber are suitably polished.

10 Claims, 3 Drawing Sheets

FIBER OPTIC POLISHING FIXTURE

FIELD OF THE INVENTION

This invention relates to fiber optics and more particularly to polishing fixtures for polishing optical fibers that are held in tight engagement by ferrules.

BACKGROUND OF THE INVENTION

Fiber optic systems require connections between optical fibers. The optical fibers are generally disposed in a longitudinal bore of a ferrule. Ferrules are generally held by an outer housing. A ferrule may be a ceramic, metal, or glass tube with a longitudinal bore in which the optical fiber is disposed. The ferrule and its outer housing comprise a fiber optic connector for connecting optical fibers. To ensure accurate mating between optical fibers, it is an accepted practice to polish the end of the optical fibers to be connected so as to have planar or slightly convex surfaces on the optical fiber ends.

A polishing fixture of some type is commonly used to accomplish polishing optical fiber ends. Examples of prior art polishing fixtures are shown in U.S. Pat. Nos. 4,741,590, issued May 3, 1988, 4,648,688, issued Mar. 10, 1987, 4,614,402, issued Sep. 30, 1986, and 4,978,193, issued Dec. 18, 1990.

One example of a prior art polishing fixture is a device with one side being a flat planar surface made out of a material resistant to abrasion and the other side having protrusions surrounding a fixture bore for engaging the ferrule and its outer housing. When inserted in the fiber optic polishing fixture, the ferrule has an exposed optical fiber end which extends through the fixture bore beyond the flat planar surface of the polishing fixture. The flat planar surface with the protruding optical fiber end is then placed into contact with an abrasive material. The optical fiber end is then polished by moving the fixture and captured ferrule along the abrasive surface until the optical fiber end is substantially flat and within the same plane as the flat planar surface of the polishing fixture. The waste generated by the polishing action collects within grooves formed in the flat planar surface of the polishing fixture. While the prior art is a generally acceptable method of polishing optical fibers, due to the method of polishing, the entire polishing fixture must be made of material resistant to abrasion. Such material is difficult to machine and is generally quite expensive.

What is needed is a polishing fixture for polishing optical fibers that is relatively easy to manufacture and inexpensive. Furthermore, the polishing fixture must also produce polished optical fibers that result in gap-free interfaces between optical fiber connections.

SUMMARY OF THE INVENTION

The present invention addresses the problems of existing fiber optic connector polishing fixtures as discussed above. The present invention is easily manufactured and significantly less expensive than existing fiber optic connector polishing devices. It is designed to effectively utilize the properties of a low-cost material that is easy to manufacture and an abrasion resistant material that is long-wearing, while still permitting polishing fixture configurations that will accommodate various types of fiber optic connectors.

According to the present invention, a multi-mode fiber optic connector polishing fixture is disclosed. The fixture has an aluminum body and synthetic ruby balls which are symmetrically secured near the outer edge of the body. The balls protrude from the body of the polishing fixture and define a polishing plane axially spaced from the body of the polishing fixture. The polishing fixture is designed to permit the optical fiber and its ferrule to be inserted into the polishing fixture, whereby the optical fiber and ferrule extend beyond the polishing plane. The optical fiber and ferrule are polished by placing the ruby balls in contact with an abrasive material and moving the polishing fixture relative to the abrasive material.

While the present invention is described in association with particular types of materials, the invention is not limited to the use of such materials in manufacturing the polishing fixture. Further, while the invention is described with respect to its use with a particular configuration of fiber optic connectors, it will be understood that the principles of the invention apply equally well to other configurations of fiber optic connectors.

Also, while the invention assumes that the optical fiber and ferrule will be polished to have a substantially flat end surface, it is understood that the polishing fixture can be designed to allow for angular or other shaped polishes. These and other features of the invention will become apparent to those skilled in the art with a more detailed description of a preferred embodiment of the invention.

DETAILED DESCRIPTION OF THE INVENTION

Figure 1:
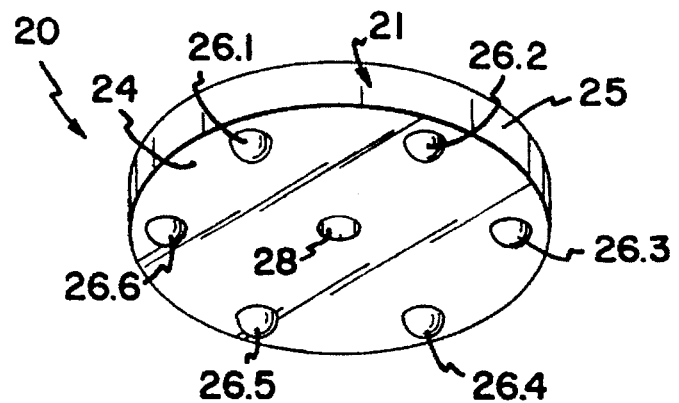
FIG. 1 is a perspective view of a lower surface of a fiber optic connector polishing fixture according to the present invention.

FIG. 1 is a perspective view of a lower surface 24 of a body 21 of a fiber optic connector polishing fixture 20. The lower surface 24 in the preferred embodiment is substantially flat. A bore 28 extends through the body 21 of the fiber optic connector polishing fixture 20. The bore 28 is positioned in the center of surface 24.

Six projected members 26.1–26.6 are placed on surfaced 24 near an outer edge 25 of the body 21 of the polishing fixture 20. Members 26.1–26.6 are symmetrically and circumferentially arranged about bore 28.

Figure 2:
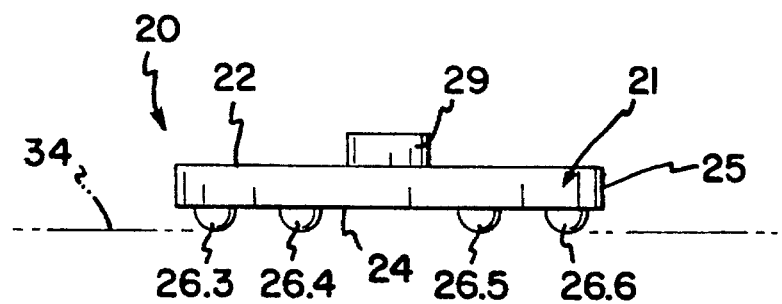
FIG. 2 is a side view of the fiber optic connector polishing fixture of FIG. 1.

FIG. 2 shows a side view of the fiber optic connector polishing fixture 20. In the preferred embodiment, the projected members 26.1 through 26.6 are spherical and project outward from the lower surface 24 of the polishing fixture body 21. The farthest points of projection of the spherical members 26.1 through 26.6 from the lower surface 24 define a polishing plane 34 which is axially spaced from the lower surface 24 of the polishing fixture body 21. In the preferred embodiment as shown in FIG. 2, the lower surface 24 of the polishing fixture body 21 is parallel to the polishing plane 34. It will be apparent to those skilled in the art, however, that the body 21 of the polishing fixture 20 could be configured such that the lower surface 24 would be positioned at a fixed angle with respect to the polishing plane 34. In such an embodiment, the projected members 26 would have to protrude from the lower surface 24 at different lengths.

Although the preferred embodiment uses spherical members 26.1–26.6, the projected members 26.1–26.6 need only be partially spherical or otherwise suitably configured to form a polishing plane axially spaced from the lower surface 24. In the preferred embodiment the projected members 26.1–26.6 are made of synthetic ruby. Synthetic ruby is a material resistant to abrasion and relatively inexpensive. As will be obvious to those skilled in the art, any other material resistant to abrasion could be used, such as, for example, steel. The body 21 of the polishing fixture 20 is made of aluminum in the preferred embodiment. Aluminum is a low-cost material and easy to manufacture. Those skilled in the art will recognize that any material that can be machined for a press fit application could be used. However, using aluminum for the body 21 and synthetic ruby for the projected members 26.1–26.6 utilizes the best properties of each material to result in a long-lasting, low-cost polishing fixture 20.

Figure 3:
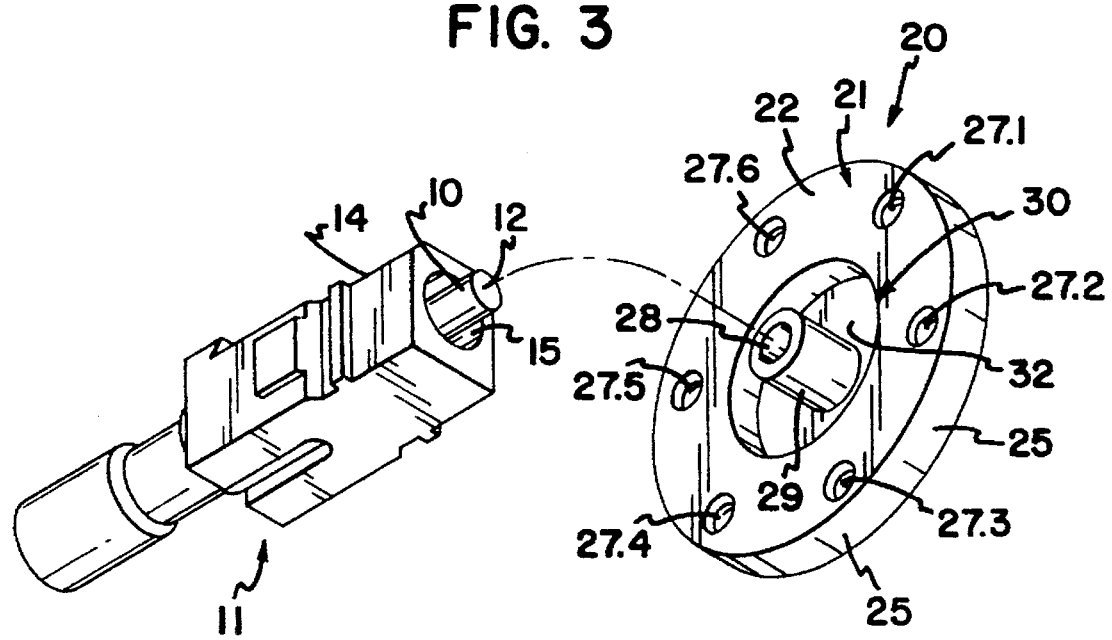
FIG. 3 is a perspective view of an upper surface of a fiber optic connector polishing fixture and a ferrule and its outer housing exploded therefrom.

Referring to FIG. 3, a perspective view is shown of a partially-shown fiber optic connector 11 which includes a ferrule 10 and its outer housing 14 exploded from the fiber optic connector polishing fixture 20. The ferrule 10 is held in tight engagement by the outer housing 14 and extends beyond one end of the outer housing 14. The housing 14 has a cylindrical bore 15 in which ferrule 10 is received. The bore 15 is sized such that the outer housing 14 is spaced from the ferrule 10. An optical fiber 12 is longitudinally disposed within a bore of the ferrule 10. It will be obvious to those skilled in the art that many different embodiments of the outer housing 14 can be configured to hold a ferrule. Similarly, it will be obvious to those in the art that the polishing fixture 20 can be configured to accommodate different embodiments of outer housings and ferrules. For example, the specific geometry of housing 14 will vary among a variety of well-known, commercially available fiber optic connectors.

Shown in FIG. 3 is an upper surface 22 of the body 21 of the fiber optic connector polishing fixture 20. In the preferred embodiment, the upper and lower surfaces 22, 24 of the body 21 are parallel and are connected by the outer edge 25. Also shown in FIG. 3 are bores 27.1–27.6 in which the projected members 26.1–26.6 are secured, respectively. The diameters of the cylindrical bores 27.1–27.6 are slightly smaller than the diameters of members 26.1–26.6 so that each of members 26.1–26.6 can be press-fit into an individual one of bores 27.1–27.6.

As shown in FIG. 3, a center section 30 of the upper surface 22 is indented. In the shown embodiment, the center section 30 is circular with a substantially flat bottom 32 which is parallel to the upper surface 22. A tubular section 29 surrounds the bore 28 and extends outward from the center section bottom 32. Bore 28 and its surrounding tubular section 29 are configured to allow the ferrule 10 to be inserted into the bore 28 with the outer housing 14 closely encircling the tubular section 29. As a result, ferrule 10 can only move axially with respect to bore 28.

Figure 4:
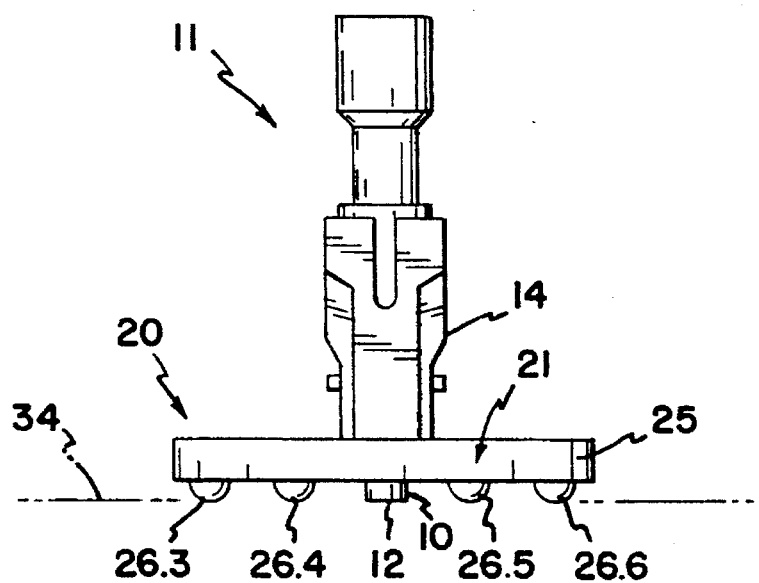
FIG. 4 is a side view of a fiber optic connector polishing fixture with a ferrule inserted therein.

When inserted, the ferrule 10 fixedly extends beyond the polishing plane 34 formed by the projected members 26.1–26.6 prior to polishing the ferrule 10 and optical fiber 12. FIG. 4 shows a side view of the ferrule 10 and its outer housing 14 when inserted into the fiber optic connector polishing fixture 20, wherein the ferrule 10 extends slightly beyond the polishing plane 34 before polishing.

In FIG. 3, the tubular section 29 is shown to be at a 90 degree angle to the center section bottom 32 (and 90 degrees to the polishing plane 34 of FIG. 2). As will be apparent to those skilled in the art, the tubular section 29 can be configured at any fixed angle relative to the polishing plane 34 in order to permit the desired polish of the optical fiber 12 to be at any desired angle relative to the axis of the fiber 12. In addition, the body 21 of the polishing fixture 20 can be configured such that the entire upper surface 22, including the center section 30 is positioned at a fixed angle relative to the polishing plane 34 to permit an angled polish or to accommodate other configurations of ferrules and their associated outer housings. It may be desirable to use such an embodiment for purposes of using different types of connectors for optical fibers.

Figure 5:
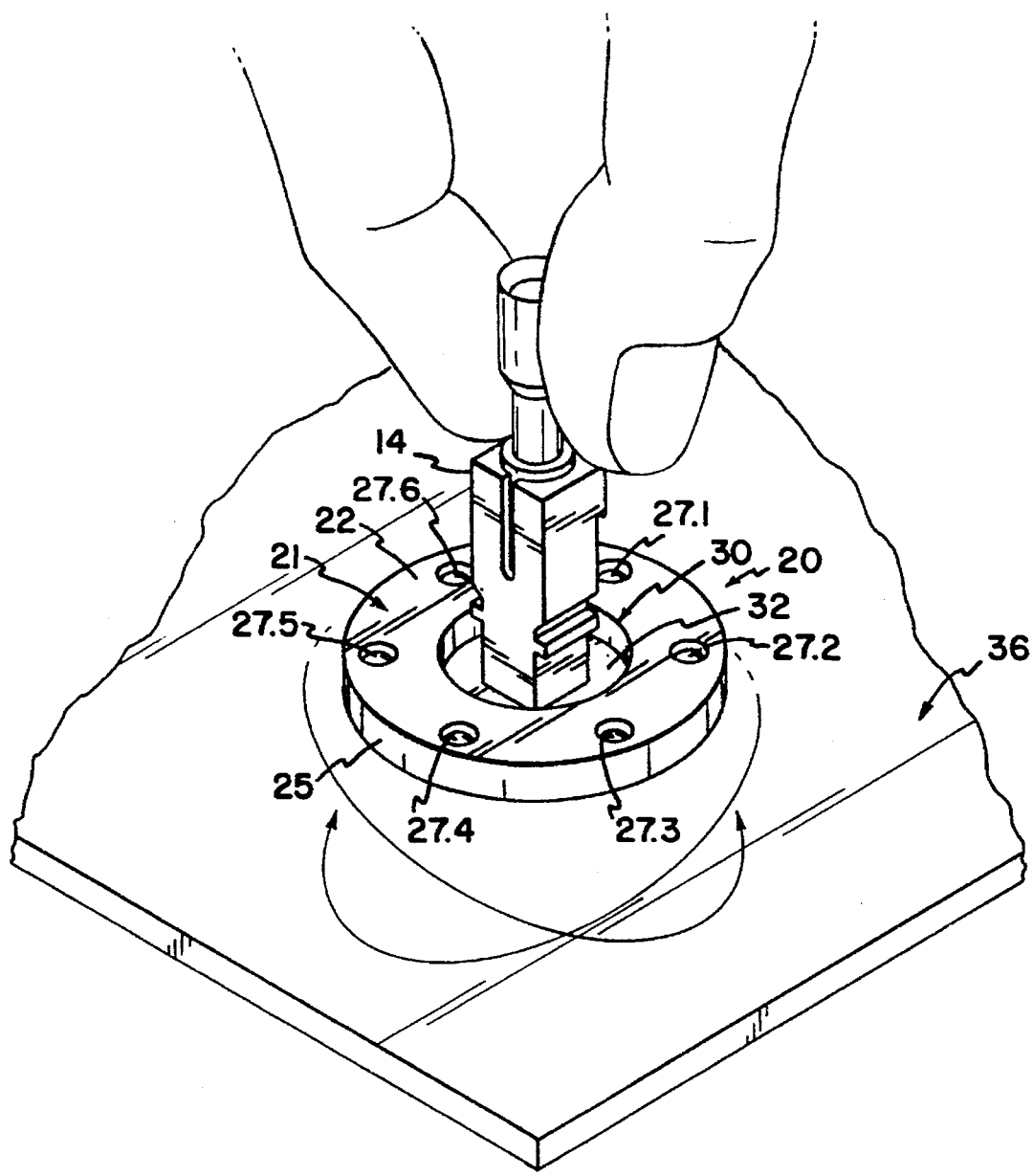
FIG. 5 is a perspective view showing the polishing of a ferrule and an optical fiber.

When the ferrule 10 and its outer housing 14 are inserted into the polishing fixture 20, the optical fiber 12 (which is axially and longitudinally disposed within the ferrule 10) is subjected to a polishing action by moving the polishing fixture 20 relative to a polishing medium 36 as shown in FIG. 5. The polishing medium 36 is made of an abrasive material such as, for example, very fine silicone carbine or aluminum oxide grit. The projected members 26 are placed in contact with the polishing medium 36. Pressure is exerted on the outer housing 14 thereby urging the polishing fixture body 21 toward the polishing medium 36. The polishing fixture 20, the ferrule 10 and the optical fiber 12 are moved across the polishing medium 36 while the pressure is being applied. The ferrule 10 and the optical fiber 12 are polished until co-planar with the polishing plane 34 formed by the projected members 26.1–26.6 The waste generated by the polishing action which wears away a portion of the ferrule 10 and the optical fiber 12 may collect in the area between the polishing plane 34 and the lower surface 24 of the polishing fixture 20, in addition to collecting outside the area beneath the lower surface 24 of the polishing fixture 20.

The bore 28 in the polishing fixture 20 is located in the center of the body 21 of the polishing fixture 20 in the preferred embodiment as shown in FIGS. 1 and 3. The projected members 26 are symmetrically aligned around the bore 28. The bore 28 can be located anywhere on the body 21 of the polishing fixture 20 so long as the pressure applied to the ferrule 10 and the body 21 does not destabilize the polishing fixture 20. In addition, the projected members 26.1–26.6 need not be placed symmetrically on the fiber optic connector polishing fixture 20 and more or less than six members may be used. A sufficient number of projected members should be located on the fiber optic connector polishing fixture 20 such that the projected members form a polishing plane as previously described herein and the polishing fixture is not destabilized when pressure is applied to the inserted ferrule in order to polish the ferrule and optical fiber.

Although the present invention has been described with reference to the preferred embodiments, those skilled in the art will recognize modification and equivalents with the benefits of the teachings of the present invention. Accordingly, it is intended that the scope of the present invention shall include such modification and equivalents and should only be limited by the scope of the claims which are appended hereto.

What is claimed is:

1. A polishing fixture configured and arranged for removeably holding an optical fiber in relative fixed relation wherein an optical fiber end is movable across a medium of sufficient abrasiveness to produce a desired polish on the optical fiber end, said polishing fixture comprising:

a. a body having a lower surface;

b. a plurality of projected members fixed in said body, and each having an exposed area extending outwardly from said lower surface of said body, each exposed area of said plurality of projected members having a lowest point, wherein the lowest points of said plurality of exposed areas define a polishing plane spaced from said lower surface of said planar body;

c. optical fiber holding means for removeably holding the optical fiber wherein the optical fiber end is exposed through said lower surface and axially movable toward said polishing plane;

d. said plurality of exposed areas are made of am abrasion resistant material; and e. the abrasion resistant material is synthetic ruby.

2. A polishing fixture configured and arranged for removeably holding an optical fiber in relative fixed relation wherein an optical fiber end is movable across a medium of sufficient abrasiveness to produce a desired polish on the optical fiber end, said polishing fixture comprising:

a. a body having a lower surface;

b. a plurality of projected members fixed in said body, and each having an exposed area extending outwardly from said lower surface of said body, each exposed area of said plurality of projected members having a lowest point, wherein the lowest points of said plurality of exposed areas define a polishing plane spaced from said lower surface of said planar body;

c. optical fiber holding means for removeably holding the optical fiber wherein the optical fiber end is exposed through said lower surface and axially movable toward said polishing plane; and d. said plurality of projected members are at least partially spherical.

3. A polishing fixture according to claim 2 wherein said plurality of exposed areas are made of an abrasion resistant material.

4. A polishing fixture according to claim 2 wherein said polishing plane is spaced from said lower surface to define a volume between said plane and said lower surface for allowing accumulation of waste generated while polishing the optical fiber end.

5. A,polishing fixture according to claim 2 wherein said fiber holding means comprises a receiving cavity formed through said body having a diameter sized to pass a ferrule in close tolerance, the optical fiber axially fixed within the ferrule.

6. A polishing fixture according to claim 5 wherein said body further comprises:

(a) an upper surface of said body; and (b) a hollow protrusion extending from said upper surface and surrounding said receiving cavity, for engaging the ferrule within said receiving cavity.

7. A polishing fixture according to claim 5 wherein said receiving cavity has a longitudinal axis positioned at a fixed angle with respect to said polishing plane defined by said plurality of exposed areas.

8. A polishing fixture according to claim 7 wherein the fixed angle is 90 degrees.

9. A polishing fixture according to claim 5 wherein said receiving cavity is formed central to said plurality of projected members.

10. A polishing fixture according to claim 2 wherein said lower surface of said body is positioned in parallel alignment with said polishing plane defined by the lowest points of said plurality of exposed areas.

\* \* \* \* \*